UNITED STATES PATENT OFFICE.

GEORGE A. PARSONS, OF WILMINGTON, MASSACHUSETTS, ASSIGNOR OF FOUR-FIFTHS TO JAMES W. SMITH AND JAMES P. PHELAN, OF LYNN, CHARLES L. SMITH, OF DORCHESTER, BOSTON, HERBERT H. PRATT, OF SWAMPSCOTT, AND HORACE M. BRIGGS, OF EAST FOXBORO, MASSACHUSETTS.

ARTIFICIAL STONE AND PROCESS OF MAKING SAME.

SPECIFICATION forming part of Letters Patent No. 668,413, dated February 19, 1901.

Application filed April 13, 1900. Serial No. 12,739. (No specimens.)

*To all whom it may concern:*

Be it known that I, GEORGE A. PARSONS, of Wilmington, in the county of Middlesex and State of Massachusetts, have invented certain new and useful Improvements in Artificial Stone and Processes of Making the Same, of which the following is a specification.

This invention has relation to the manufacture of artificial stone which may be molded into shape for employment in place of tiles, bricks, &c.

The object of the invention is to provide, first, artificial stone in which the waste product forms substantially the entire base and a process by means of which the artificial stone may be produced most economically.

In the manufacture of the composition I employ as a base desiccated waste material, such as sawdust, and I prefer to employ the last-named substance because it has not only heretofore been allowed to go to waste, but it is sufficiently comminuted to serve my purposes, being porous and adapted to receive the solution, which renders it hard and durable.

In carrying out my process I first subject the sawdust to a desiccating process to remove all moisture, after which it is mixed with silicate of soda in solution. To produce this solution, I employ silica ($SiO_2$) in powdery form and mix it with three or more times its weight of caustic soda (NaOH) and after heating them to white heat pour the mixture into boiling water. I then add, in the protion of one to ten, a very weak acid to render the solution gelatinous without precipitating the silica. Any mineral acid may be employed for this purpose. The sawdust is mixed with the solution, sufficient of the solution being employed to thoroughly permeate the pores of the sawdust and make a plastic mass. The mass is dried until it becomes sticky, after which it is treated with a solution of lime, either in the form of oxid, carbonate, chlorid, or hydrate, and is then allowed to dry sufficiently to enable it to be handled, when it is subjected to pressure and is made into any form desired. The compressed masses are then exposed to air and are allowed to harden. The resultant composition is practically a hard stony mass of wood fiber and silicate of lime.

The composition, as previously stated, may be used as a substitute for marble, baked clay, and stones of various kinds for floors, wainscoting, and the like, and the composition is variously colored, whereby it may be used in mosaic-work.

The pigments are added during any of the steps of the process in forming the composition.

In lieu of sawdust I may employ any other vegetable substance in a comminuted state.

It is evident that in lieu of sodium hydrate or caustic soda I may employ the hydrate of any other alkali metal, although I prefer to use caustic soda rather than caustic potash, as the latter is deliquescent and the former is efflorescent.

Having thus explained my invention, what I claim is—

1. An artificial-stone composition consisting of a vegetable base, a compound of silica and hydrate of an alkali metal the latter predominating over the silica in the proportion of three or more of said hydrate to one of the silica, a weak acid, and lime.

2. The herein-described process which consists in mixing silica in powdery form with three or more times its weight of a hydrate of an alkali metal and heating them to white heat and then pouring the mixture into boiling water to produce silicate of soda in solution, adding a weak acid to neutralize the soda and strengthen the adhesive quality of the mixture, impregnating desiccated vegetable matter with the solution thus formed, partially drying the mass and then treating it with a solution of lime, then drying and pressing the composition and finally exposing the compressed mass or masses to air to harden the same.

In testimony whereof I have affixed my signature in presence of two witnesses.

GEORGE A. PARSONS.

Witnesses:
MARCUS B. MAY,
P. W. PEZZETTI.